United States Patent [19]

Huhne

[11] 4,268,341

[45] May 19, 1981

[54] ZERO WASTE ORDER CHANGE SYSTEM FOR A CORRUGATOR

[75] Inventor: Paul Huhne, Amsterdam, Netherlands

[73] Assignee: S&S Corrugated Paper Machinery Co. Inc., Brooklyn, N.Y.

[21] Appl. No.: 923,714

[22] Filed: Jul. 12, 1978

Related U.S. Application Data

[63] Continuation-in-part of Ser. No. 886,941, Mar. 15, 1978, abandoned.

[51] Int. Cl.[3] .......................... B32B 31/00; B31F 1/20; B26D 5/20; B32B 31/18

[52] U.S. Cl. .................................... 156/353; 156/359; 156/361; 156/470; 156/207; 156/210; 156/269; 156/510; 493/463; 83/60; 83/35.3; 83/408; 425/303; 156/462; 156/352

[58] Field of Search ............... 156/462, 205, 207, 210, 156/269, 270–271, 470, 473, 352, 353, 359, 361, 324, 510; 93/58.4; 83/58, 60, 408, 353; 425/182, 184, 303; 264/145, 286

[56] References Cited

U.S. PATENT DOCUMENTS

| | | | |
|---|---|---|---|
| 2,985,223 | 5/1961 | Thorn | 156/470 |
| 3,805,652 | 4/1974 | Lalonde et al. | 83/169 |
| 3,977,929 | 8/1976 | Evans | 156/361 X |
| 3,981,758 | 9/1976 | Thayer et al. | 156/64 |

FOREIGN PATENT DOCUMENTS

| | | | |
|---|---|---|---|
| 827629 | 11/1969 | Canada | 156/359 |

*Primary Examiner*—John T. Goolkasian
*Assistant Examiner*—Lois E. Rodgers
*Attorney, Agent, or Firm*—Ostrolenk, Faber, Gerb & Soffen

[57] ABSTRACT

A changeover system for a corrugator designed to halt the corrugator during the changeover to diminish paper loss. When the corrugator is halted, a traveling knife severs the combined webs adjacent the beginning of the steam table run. The slitter scorer and the cutoff are changed and the corrugator is restarted. The traveling knife which severs the combined webs may operate above the steam table or below the steam table; alternate forms may be used.

11 Claims, 5 Drawing Figures

ZERO WASTE ORDER CHANGE SYSTEM FOR A CORRUGATOR

This application is a continuation-in-part of application Ser. No. 886,941, filed Mar. 15, 1978 and now abandoned.

The present invention relates to corrugators and more particularly to a currugator wherein a changeover from one type of box blank to another may be accomplished without wasting board.

In high speed corrugators which have been known to have reached an output speed of 600 feet per minute, the board which may be of the order of eight feet wide is fed through the currugator at its maximum speed. When a changover to new box lengths or new settings is desired, preparations are made in subsidiary machinery hereinafter described so that the changeover may take place rapidly. But even if the changeover were to take as little as 15 to 20 seconds, 150 feet of board or more will have passed through the machine and been wasted during the changeover operation.

In general as is well known in the art and as is hereinafter described, the corrugator structure includes or is followed by a slitter scorer which has a number of blades so arranged as to slit the corrugated board longitudinally and to apply scorings where desired. It is obvious that for different widths of box blank, the slitters must be spaced at different distances from each other and that the scoring wheels which determine the relationship of the longitudinal panels to each other must be changed.

It is well known in the art to utilize a three part slitter-scorer in which three sets of slitter scoring elements are mounted on three pairs of shafts which in turn are mounted on a spider. When a particular set of slitter-scorers is used on one pair of shafts the second and third pairs of shafts may have their slitting and scoring blades reset for the nest operation.

The double face corrugated board of the type usually used in cartons (or even double, double currugated board which has a central liner, two corrugated mediums, and two outer liners) must be cut to length as the board leaves the currugator since the double face corrugator board or double board is inflexible. Therefore a cutoff is provided as is well known in the art at the output end of the slitter scorer in order to sever the board longitudinally to the desired length. Since the width of the board which is passed through the corrugator may be enough for two boxes the slitter separates the board into the desired widths by a longitudinal slit and other slitting elements on the slitter may be utilized to trim the board along its edges to the desired width. The cutoff is therefore usually provided with two pairs of knives that may take the output from each of the two longitudinally running corrugated webs in order to provide appropriate cutting of these webs to the desired size.

In a changeover the cutoff must be varied so that it will cut a different length from that which was cut before and where two webs are being cut both sets of cutoff knives must be so varied. It is also well known in the art to arrange the cutoff so that each set of cutoff knives may be preset so that on the occurrence of a desired signal or on any other manipulation by the operator the cutoff knives will be adjusted to the new setting.

When it is desirable to make a changeover from one size box of one type of run to another, the slitter scorer must be operated so that the prepared and preset set of knives on one fo the unused pair of shafts on the spider; as previously described, will move into the operative position while the prior set will move out of the operative position; at the same time the cutoff is operated so that the knife blades on both sets of knife shafts will be adjusted for a different rate of operation in order to cut different lengths. If this changeover takes as little as 15 seconds, then 150 linear feet of corrugated board by approximately the 8 foot width are lost, resulting in a loss of 1,200 square feet of board. If the changeover takes as mush as a minute then of the order 5,000 feet of board may be lost.

Considering the cost of the raw material and the value of the output board; this loss cannot be readily accepted and attempts have been made to make the changeover as fast as possible.

The present invention is directed to means for halting the corrugated board during the changeover operation so that virtually no board will be lost during the changeover operation.

For this purpose, means are provided in the form of a traveling knife which will sever the board just as it leaves the corrugator consisting of the single facer, double facer and other devices, hereinafter described, and before the board has an opportunity to extend along the length of the drying system which is used which is usually a very long steam table which may be of the order of 48 to 60 feet long or longer.

With the board thus severed at the point where it enters the steam table, the remainder of the board which is on the steam table passes through the slitter scorer and the cutoff according to the old program. When that old board has gone through approximately 10 seconds or less after the transverse cut has been made, the slitter scorer and the cutoff are adjusted to the new size. Thereafter the corrugator elements are reactivated so that the board may now resume its flow.

An important object of the present invention, therefore, is the provision of means for halting the corrugator operation immediately prior to a changeover operation from one size to the other.

The board is moved over the steam table by a belt. The appropriate location for severence of the board, therefore, should be a position where the board has entered the bit of the belt so that it may be held by one end of the belt but has not yet moved substantially into the belt.

Accordingly the transverse severance of the corrugated board will preferrably occur in the gap between the first and second steam chest of the steam table most adjacent to the corrugating mechanism so that the severed board will be able to proceed through to completion, and where the portion of board extending back to the corrugator will be in contact only with the first steam plate which is the order of two feet in longitudinal length (by about 8 feet transversely); this area of contact will serve to pull the board out of the currugating apparatus when the currugating apparatus is permitted to operate once more.

Thus a further object of the present invention is the provision of simplified means for severing the corrugated board adjacent the corrugating mechanism at the time a changeover is to take place.

A further and important object of the present invention is to locate the point of severance closely adjacent to the corrugating mechanism so that the board that is already on the steam table will be fed through to be processed through the slitter scorer and the cutoff while only a minimum of amount of board will be left in the bit of the belt so that the board may be drawn in when the corrugating apparatus is reactivated.

The severing knife which is utilized in order to separate the corrugated web during the changeover may be constructed that it operates beneath the steam table or above the steam table.

The foregoing and many other objects of the present invention will become apparent in the following description and drawings in which.

Figure 1:
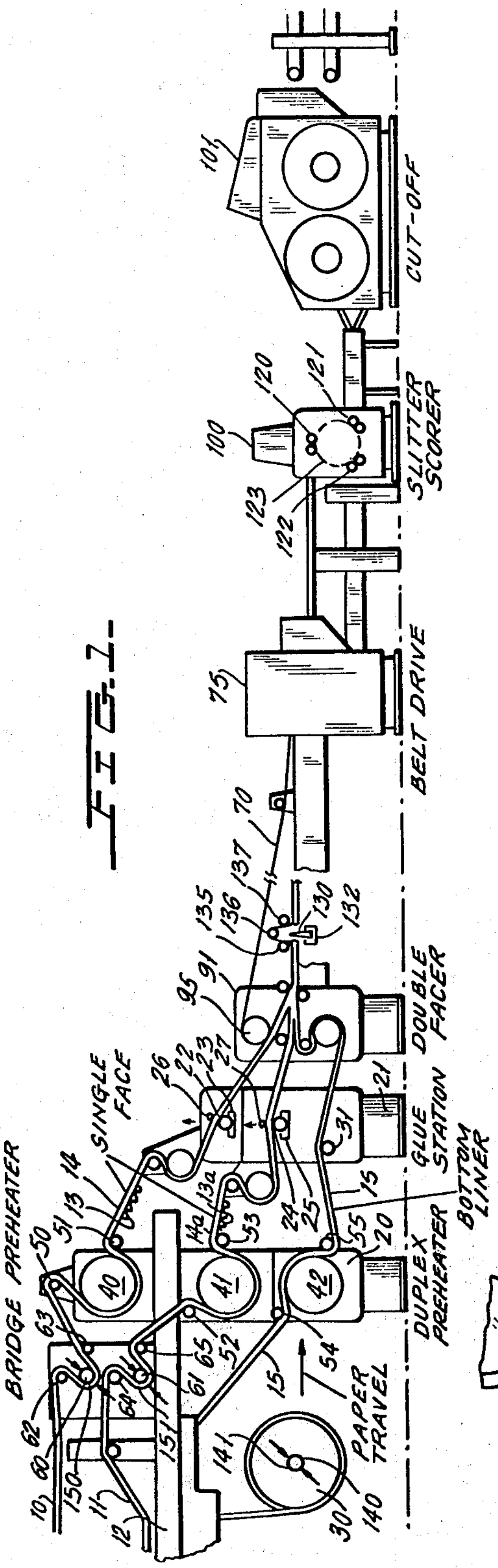
FIG. 1 is a schematic view of the corrugating machine elements for forming board of the double double type.

In the corrugator shown in FIG. 1 single face corrugated material 10, is stored on a bridge 12. The material which is to form the corrugated medium 13 of single face 10 material is passed through corrugating rolls and adhesively secured to the outer liner 14. This applies also to the single face material 13*a* and the outer liner 14*a* of the single face corrugated material 11. Usually as is also well known the single face board is stored on a bridge and since it is flexible it is stored in a series of pleats, and may then be drawn off to form the double face board. The portion of the mechanism shown is that where the board is combined to form double double board. If the single face section 10 is not used but only the single face section 11 is used, then in combination with the bottom liner 15 ordinary double face corrugated board is formed having an outer liner 14*a*, a corrugated medium 13*a* and another outer liner 15.

The corrugated material 10, the corrugated material 11, and the bottom liner 15 are led from the duplex preheater 20 into and through the glue station 21. The glue station 21 is provided with glue roller 22 operating within glue applicator 23 and glue roller 24 operating within glue applicator 25. The glue rollers 22 and 24 are also provided with idler rolls 26 and 27 respectively which guide the material into appropriate contact with the glue roller. The board 10 is led into the glue station so that the glue roller 22 applies adhesive to the crests of the flutes of corrugated section 13; roller 24 of applicator 25 applies adhesive to the crests of the flutes corrugated section 13*a* of board 11.

The outer liner 15 is led from its mill roll stand 30 through the preheater 20 and guided over roller 31 in the glue applicator in glue station 21. The duplex preheater 20 is well known in the art and is provided with a number rolls 41, 42 40 which are heated and precondition the paper appropriately to receive the glue. The liner 10 is given an appropriate wrap around the preheating roll 40 by the idler rollers 50, 51. The board 11 is given appropriate wrap around the preheating roll 41 by the idle roller 52, 53. The bottom liner 15 is given an appropriate wrap around the preheating roll 42 by the idler 54 and 55.

The board elements are driven through the apparatus by drive rollers 60, 61 around which the corrugated members 10 and 11 are wrapped by the guide rollers 62, 63, 64 and 65.

The bottom line 15 is threaded through the duplex preheater and guided by roller 31 through the gluing station; when the board is combined, it is driven, as hereinafter described, into the bite of the belt so that it is drawn by the belt.

The upper belt 70 is driven by the belt drive mechanism 75 which is also well known and needs no further description here. Its function is to move the belt 70 so that the lower run 71 thereof, is driven in the direction indicated by the arrow to draw the completed corrugated board in that direction over the steam table 80 which consists of a plurality of steam chests 81, 82 extending the width of the board and usually of the order of two feet in longitudinal length. Depending upon the type of corrugator and the speed at which it is desired to run, the steam table is provided with 24 or more steam chests. In the event the paper is run more slowly or delicate paper is run, then, as is well known in the art, one or more of the steam chests may be moved down out of contact with the paper.

Prior to entering the steam table, the bottom line 15 is guided by rollers 90 in the belt stand 91 as well as roller 92 so that it meets the flutes of the intermediate corrugator member 11 in the belt drive stand 91. Similarly the upper corrugator member 10 is guided by the belt 70 and its roller 95 so that it meets the liner 11 in the belt stand 91. The rollers 96, 97, not only guide the belt, for instance, with respect to roller 97 but also guide the various liners into appropriate contact with each other so that the adhesive which is already applied will now engage the adjacent liner member. The lower run of the belt now drives the corrugated board toward the right with respect to the figures through the belt drive stand 75 to the slitter scorer 100 and the cutoff 101.

When the paper first leaves the gluing station 21 it is fed between the lower run 71 of the belt and the first steam chest 81.

In FIG. 1 the belt has been shown foreshortened between the belt stand 91 and the belt drive stand 75; breaks have been shown in both the belt and the corrugated board so that distance between members 91 and 75 is substantial.

The stand 75 contains the driving means for the belt, the belt being looped around a drive roll, the opposite end of the belt being supported by the idler roll 95. If the roll 95 should be driven, it must be driven in exact synchronism with the drive for the belt 70 in the belt drive 75.

When reset shaft of the slitter scorer is moveed into position, if the corrugator continues to operate, the board which is inflexible is mangled.

Similarly while a changeover is being made in the cutoff 101 to boards of different lengths, the board going through the cutoff will be cut to random lengths of different size between the first desired length and the second or ultimate desired length which is to be reached at the completion of the adjustment.

In order to obviate the loss of board which occurs for this reason, the present invention provides a traveling knife 130 comprising a knife blade carried by a chain 131, 131 in guide 132 which may be rapidly passed through the corrugated board immediately after the corrugated board has reached the position where it is within the bite of the belt 70.

Figure 3:
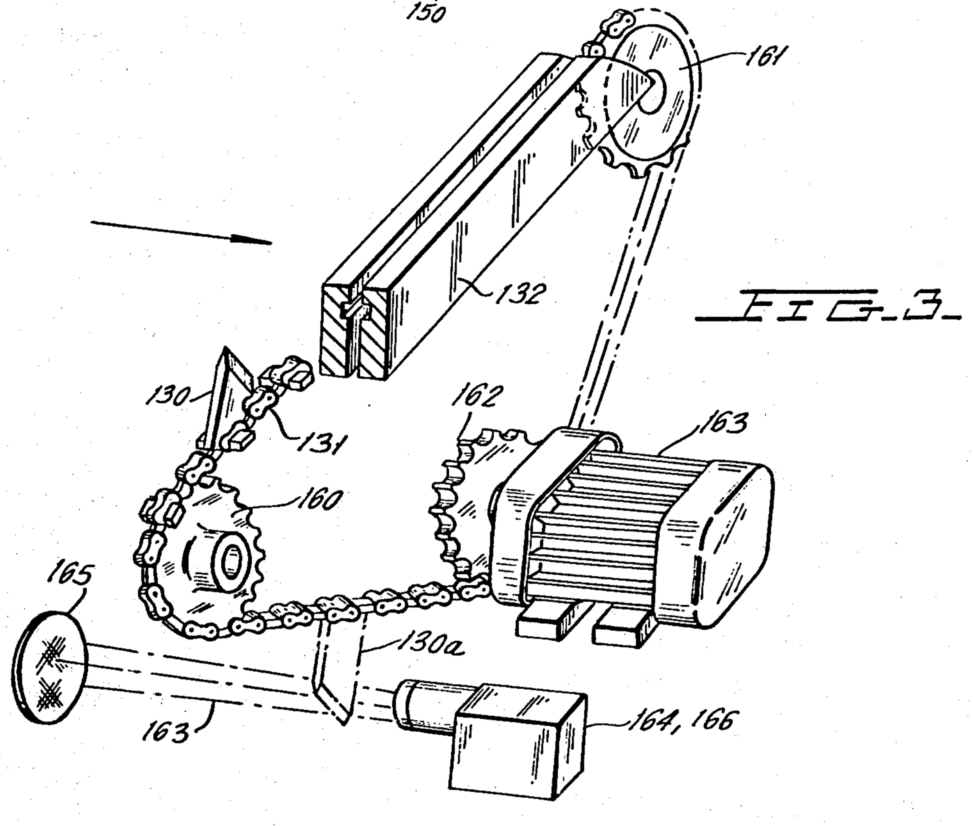
FIG. 3 is a schematic view in the perspective of the severing knife.

For this purpose the chests 81, 82 may be separated slightly or the knife may be narrowed so that they need not be separated any further than they usually are and a set of rollers 135, 136, and 137, is provided to guide the section 71*a* of the belt around and away from the path of the knife. The knife operation is shown better in view of FIG. 3.

The chain 131 which carried the knife 130 operates over sprockets 160, 161 (FIG. 3) and motor sprocket 162 driven by the motor 163. The closing of an appropriate circuit (not shown) will start the motor. When the traveling knife 130 reaches the dotted line position 130*a* it will interrupt the light beam 163 from the light source 164 to mirror 165 to the photo-responsive device 166 to halt the operation of the knife 130.

Brakes are applied in the corrugator at the appropriate places, a brake 140 being applied to the shaft 141 of the mill roll stand for the bottom liner 15; brake 150 being applied to the drive shaft 60 for the top single face corrugated board 10; and brake 151 being applied to the drive roller 61 for the intermediate single face corrugated medium 11.

The brakes 140, 150, 151, are interconnected in a manner which is well known in the art so that they may be operated simultaneously.

Figure 4:
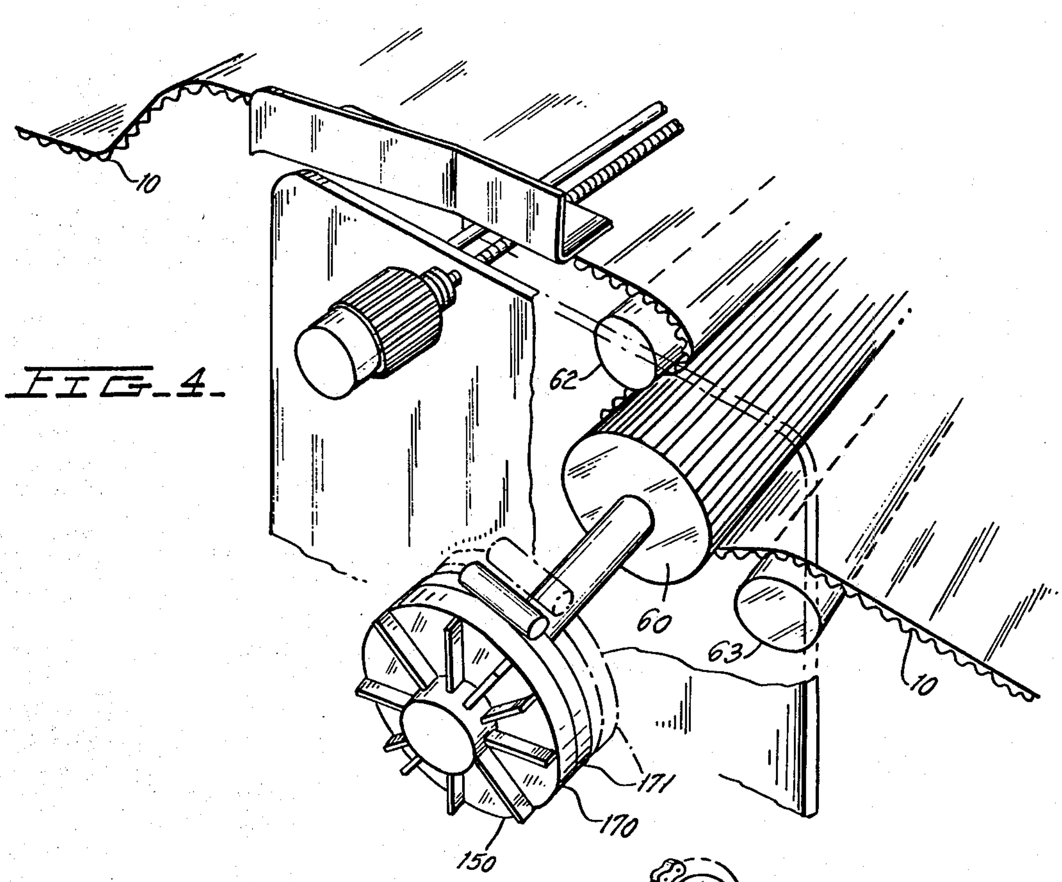
FIG. 4 is a schematic view in perspective of one form of braking mechanism which may be used at the various shafts of the currugator in order to halt the corrugator as hereinafter described.

In FIG. 4, one of the brakes 150 is shown schematically. It consists of a pair of brake discs 170, 171, one mounted on the shaft of roller 60 and one stationarily mounted. One of the discs may be driven toward the other to effect a braking action and driven away to permit the operation to continue. The brake operation is not shown in detail since such brakes are well known and the invention relates to the system rather than the details of the brakes.

Similarily the knife 130 is so arranged that as soon as brakes 140, 150 and 151 are set and before there is any further pull on the paper, the traveling knife 130 has moved from one side to the other of the board to sever the board. The belt is not harmed because of the utilization of the loop 71*a*. The end of the board above steam chest 81 is still subject to the operation of the belt, the remainder of the board to the right of the knife passes through the slitter scorer 100 and the cutoff 101. As soon as this occurs the slitter scorer 100 is changed to the next setting, the cutoff 101 is changed to the next setting and the brakes 140, 150, 151 are released. The paper being held by the section of belts 71 above the steam chest 81 now begins to move through the corrugator. It is possible that if the changeover takes an unexpectedly long period of time the initial two feet of the paper for the next order may be somewhat singed although this is not necessarily the case; but instead of losing from 150 to 600 linear feet of board ranging up to as much as 5,000 square feet, no board is lost or at the most 2 linear feet are lost.

Figure 2:
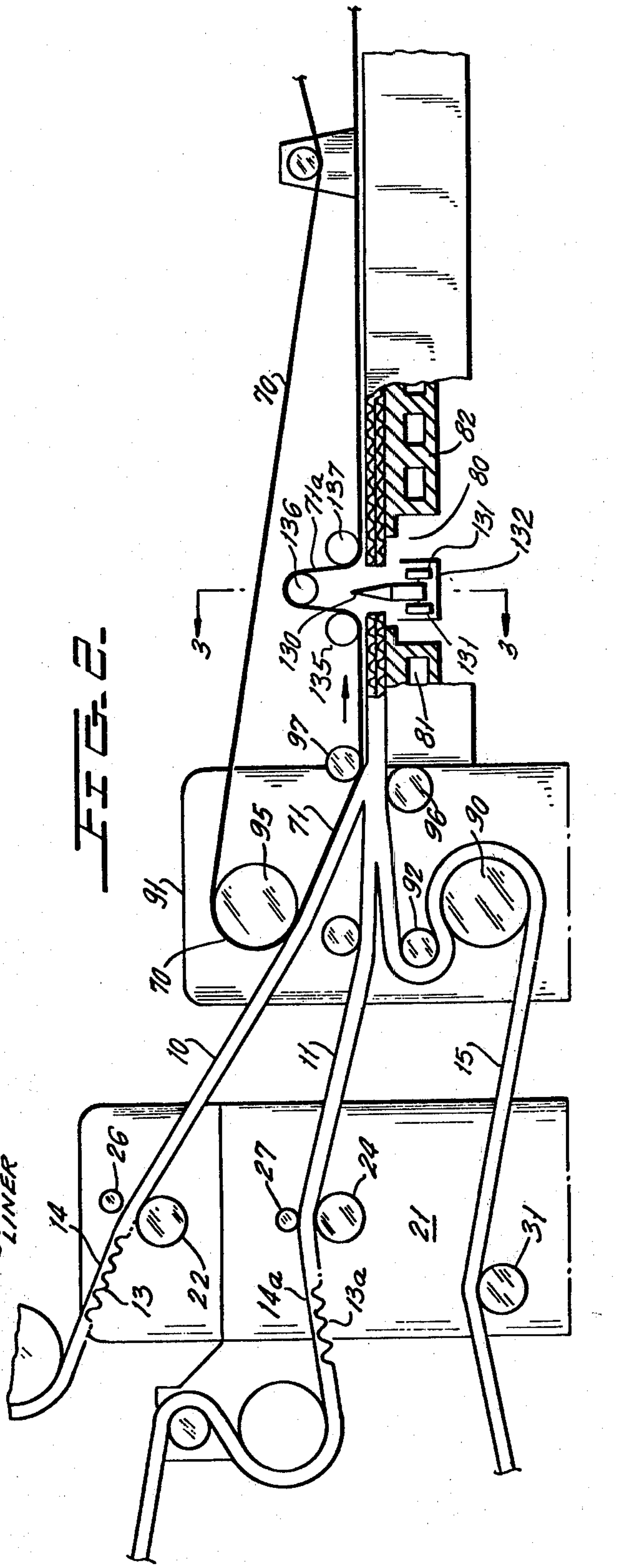
FIG. 2 is an enlarged view partly in section of the left hand of FIG. 1.
Figure 5:
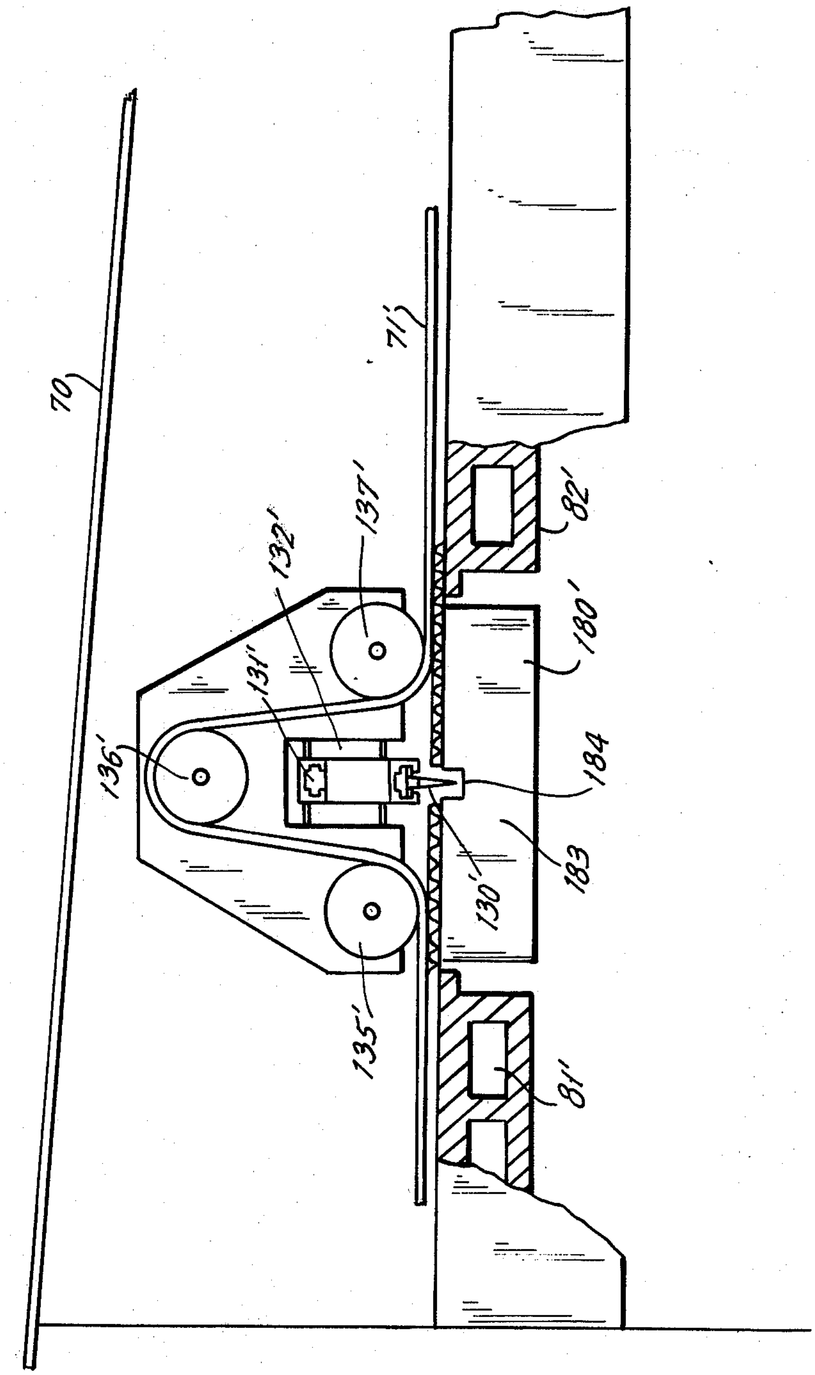
FIG. 5 is a side view partly in section of a modified form of the structure of the present invention in which the severing knife operates from above the web rather than below the web as described in connection with FIGS. 1 through 4.

In FIG. 5 there is shown a modified form of the invention in which the knife operates from above the steam table rather than below the steam table. A dummy steam chamber 183 is placed between the steam chambers 81', 82'. The dummy steam chamber has a groove 184 in which the knife blade 130' may operate to sever the board on the corrugator. In this case, the track 132' is supported above the corrugator and driven by a motor connected to the chain 131 at the side of the corrugator rather than under the corrugator. When the signal is received to sever the paper, the corrugated web is halted. The rail 132' by the sprocket 131' and similar to the motor of FIG. 3, but at the side, in order to achieve the severance operation. Also, a photocell signaling device consisting of members identical with the members 164, 166 and 165 of FIG. 3 will be used when the knife completes its operation in order to signal the halt of the motor which drives the knife and to signal the resumption of operation of the corrugator. The run 71' of the belt is guided around the idler rollers 135', 136', 137' in order that the belt not be severed together with the web and also to guide the belt around the knife operating mechanism carried on the rail 132'. The utilization of the dummy steam plate 183 with the groove 184 permits the operation to occur without interference with the operation of the corrugator. Where twenty four plates are used the elimination of one two foot long plate at the point of slitting by the knife 130' may not have any deleterious effect and, of course, an additional plate may be added at the end of the table in order to provide appropriate heating surface. A dummy steam plate 183 as shown in FIG. 5 is preferable although a separate steam plate may be constructed with the groove except that this would require a special casting operation for just one of the plates. It is also obvious that the same type of steam plate structure may be used as in FIGS. 1 and 2 without the use of a dummy steam plate but with the plates 81' and 82' separated only slightly as are the corresponding steam plates 81, 82 in FIG. 2 in order to provide a space within which the knife 130' may operate.

In the foregoing the present invention has been described solely in connection with preferred illustrative embodiments thereof. Since many variations and modifications of the present invention will now be obvious to those skilled in the art, it is preferred that the scope of this invention be determined not by the specific disclosures herein contained but only by the appended claims.

I claim:

1. In a corrugating machine having means for moving and combining a plurality of webs including at least a web for forming an outer liner and a web for forming a corrugated medium, rotary drive means in said corrugator for converting said last mentioned web into a corrugated medium and means for applying and securing said corrugated medium to said web for forming an outer liner; a supply roll for each web and a heated table for receiving said combined webs; said rotary means moving said combined web onto said heated table; and a continuous belt in engagement with said combined web on said heated table along said heated table; the surface of said table engaged by said combined web having a transverse gap adjacent the section of the table first engaged by said combined web;

a knife member operable transversely in said gap and brake members for said rotary drive means and said supply rolls for each web;

said knife member being located outside of the path of said combined web on said table while said web is moving along said table;

means for operating said brake members to halt the movement of said webs and said combined web;

and means operable, upon operation of said brake members, to move said knife member in said gap across said table and combined web to sever said combined web.

2. The corrugating machine of claim 1 wherein said belt thereafter removes the portion of said combined web on the section of said table on the other side of said gap from said rotary drive means.

3. The corrugating machine of claim 2 wherein the gap is located at a portion of the table where the web has entered the bit of the belt so that it may be held by one end of the belt but has not yet moved substantially into the belt.

4. The corrugating machine of claim 3 wherein guide members are provided for the belt on each side of the gap leading said belt out of the section through which the knife passes.

5. The corrugating machine of claim 4 in which a moving support is provided for said knife; said knife being normally positioned to one side of said table; said moving support driving said knife through said gap past the other side of said table after said brakes are operated to halt the machine.

6. The corrugating machine of claim 5 wherein said moving support for said knife is a continuous chain.

7. The corrugating machine of claim 6 wherein said table comprises a plurality of steam chests and wherein one pair of successive steam chests are spaced from each other to provide the gap for receiving the knife.

8. The corrugating machine of claim 6 wherein said table comprises a plurality of steam chests and where one of the chests associated with the said knife is a dummy steam chest having a groove therein for receiving said knife.

9. The corrugating machine of claim 7 wherein an additional guide for said knife is provided beneath said gap.

10. The corrugating machine of claim 8 wherein an additional guide for said knife is provided above said gap.

11. The corrugating machine of claim 6 wherein a guide is provided for said knife adjacent to said gap.

* * * * *